Patented June 2, 1942

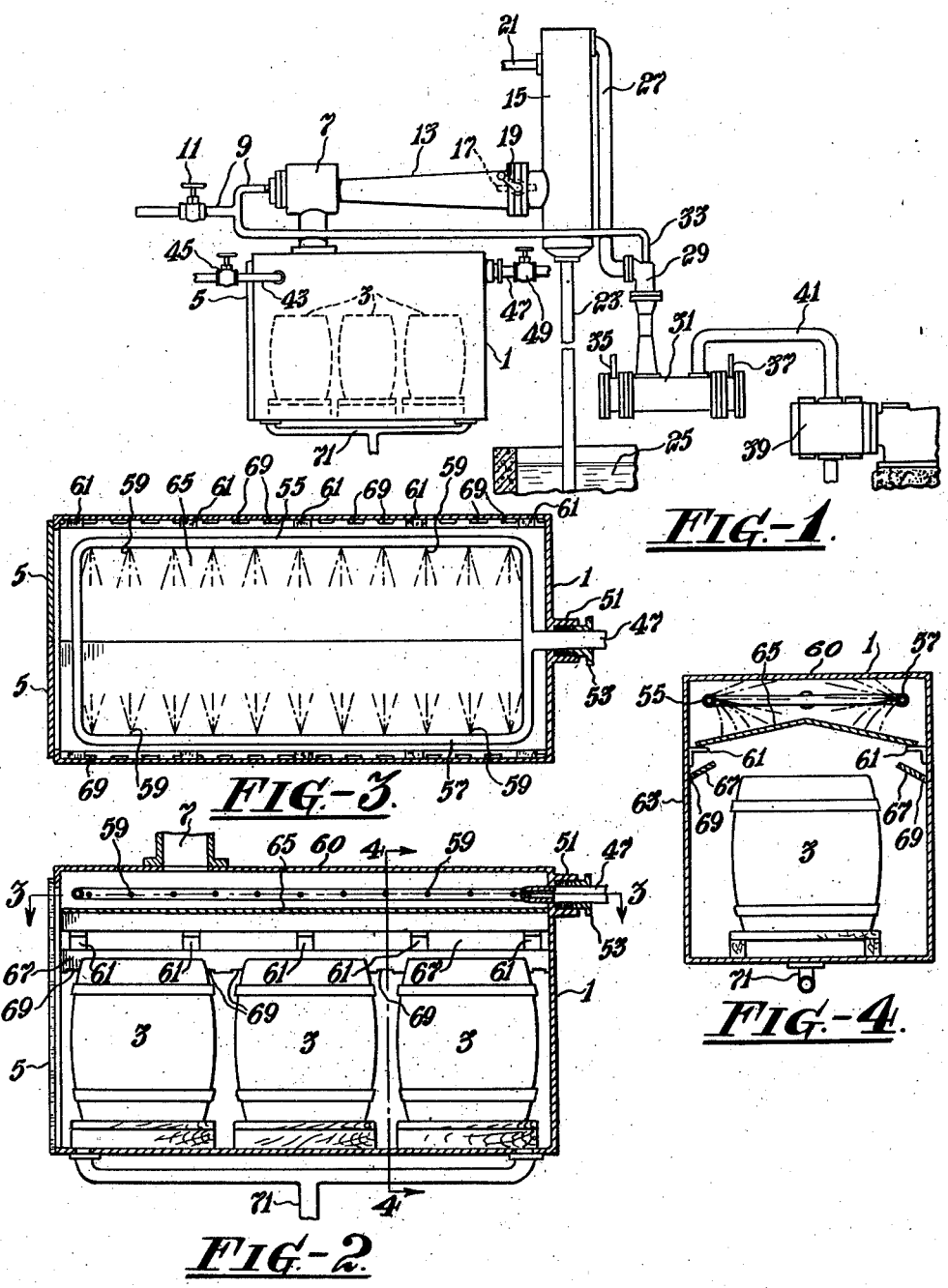

2,285,331

UNITED STATES PATENT OFFICE 2,285,331

APPARATUS FOR TREATING ORGANIC MATERIAL

Frank B. Doyle, Phillipsburg, N. J., assignor to Ingersoll-Rand Company, New York, N. Y., a corporation of New Jersey Application October 17, 1939, Serial No. 299,797

2 Claims. (Cl. 131—133)

The present invention relates to an organic material treating apparatus and, more particularly, it relates to a means of raising the moisture content of the material being treated, during the treatment.

In the processing of organic material, such as tobacco, the material is placed in a chamber and subjected to a low absolute pressure or vacuum. When the material is subjected to the vacuum the moisture content of the material is materially reduced, since the moisture boils off or evaporates due to the reduction in pressure in the chamber. Thereafter, steam is introduced into the chamber and the material is again subjected to a vacuum. The introduction of the steam not only heats the material but also the chamber walls. Upon reevacuation, the pressure in the chamber is reduced and the steam is removed.

As the steam in the chamber is withdrawn, during the evacuation period, the steam remaining in the chamber is superheated, due to the reduction of pressure in the chamber and the heat radiated by the chamber walls. Superheating of the steam will tend to raise the temperature of the material which drives off additional moisture from the material and is undesirable, since one of the objects of processing a material is to prepare it for manufacturing purposes and, consequently, the moisture content of the material must be maintained or controlled.

I have found that this superheating of the moisture in the chamber may be overcome by introducing water into the chamber, after the steam has been introduced, in such a manner that it will cool the walls of the chamber without coming into direct contact with the material being treated and thus preventing the evaporation and superheating of the moisture in the material and excessive heating of material and chamber.

It is, accordingly, an object of this invention to provide an organic material treating apparatus wherein heating of the material being treated above a temperature corresponding to the pressure of the vapor in the chamber is prevented.

It is another object to provide means in an organic material treating apparatus which will maintain the moisture content of the material being treated during reevacuation.

A still further object is to provide means in an organic material treating apparatus to subject the material being treated alternatively to a vacuum and steam any number of times without excessive heating and drying the material.

Another object is to provide a means in an organic material treating apparatus to introduce water into the treating chamber without permitting the water to contact the material being treated.

Still another object is to provide an organic material treating apparatus with means to cool the walls of the treating chamber.

These and other objects will become apparent from the following description of which the drawing forms a part and in which similar reference numerals refer to similar parts.

Figure 1 is an elevational view of an organic material treating apparatus embodying the present invention.

Figure 2 is a sectional view of the treating chamber shown in Figure 1 and illustrates details of the invention.

Figure 3 is a sectional view taken along line 3—3 of Figure 2.

Figure 4 is a sectional view taken along line 4—4 of Figure 2.

In Fig. 1 is illustrated one type of an organic material treating apparatus which comprises a treating tank 1 in which the material to be treated, contained in the hogsheads 3 such as shown in dotted lines, are placed. The hogsheads 3 are introduced into the chamber through the door 5 which is so constructed that, upon closing, there can be no leakage of air into the chamber. Mounted on the top of chamber 1 and communicating with the material of the chamber is a steam jet evacuator 7 through which steam is supplied through the conduit 9 controlled by the valve 11, placed between the evacuator 7 and the steam supply header (not shown). The throat 13 of the steam jet 7 extends and terminates in the barometric condenser 15.

Communication between the throat 13 and the condenser 15 is controlled by the blast gate 17, shown dotted, having an operating handle 19. The barometric condenser 15 is of standard construction and receives cooling water through the conduit 21 which, after passing through the condenser, is discharged through the tail pipe 23 to the hot well 25. The cooling water normally maintains the condenser at a low absolute pressure.

Near the top of the condenser a pipe 27 furnishes a means of communication between the interior of the condenser and a second steam jet evacuator 29 which is located above and discharges into the surface condenser 31. The pipe 27 opens into the condenser 15 near the top thereof for the purpose of removing the uncondensable gases which may be discharged into the condenser by the evacuator 7. It will be noted that the conduit 9 has a branch connection 33 supplying steam to the evacuator 29. In order to condense the steam discharged by the evacuator 29, the surface condenser 31 is supplied with cooling water through the conduit 35 and this water is discharged from the condenser through the conduit 37.

The vacuum pump shown at 39 is connected to the upper part of condenser 31 by the pipe 41 in order that uncondensable gases in the condenser 31 may be removed therefrom. At one side of the chamber 1 a steam supply conduit 43, having an appropriate control valve 45, is provided so that steam may be introduced into the chamber during the operation of the apparatus, as will be explained hereinafter.

In the operation of this apparatus, the material 3, which is to be treated, is placed in the chamber 1. The blast gate 17 is opened and assumes the position shown in Fig. 1 and the vacuum pump 39 is started. The vacuum pump will withdraw air from the chamber 1 through the evacuator 7 which acts as a conduit to the condenser 15, pipe 27, evacuator 29, condenser 31 and pipe 41. When the vacuum pump has reached its capacity, further operation of the pump will not reduce the pressure in chamber 1 and it is then necessary to start the evacuators 7 and 29 by opening the valve 11. At first, the evacuator 29 will remove air from the chamber 1 through the evacuator 7 and the condenser 15 but, as soon as pressure in the condenser 15 has dropped to the working pressure necessary for the operation of evacuator 7, that evacuator will begin to function. Therefore, since the evacuators are designed to work at different pressures, the evacuator 29 will begin to function when the vacuum pump 39 has reduced the pressure in chamber 1 to the efficient working pressure of evacuator 29 and evacuator 29 will reduce the pressure in the chamber 1 still further until the evacuator 7 can begin to function.

When the pressure in chamber 1 has been reduced to a very low degree, the evacuators 7 and 29 are stopped by closing the valve 11 and the blast gate 17 is swung to its vertical position by the handle 19 to prevent communication between the throat 13 and the barometric condenser 15. Thereafter, the valve 45 in the steam supply conduit 43 is opened and steam is introduced into the chamber 1. After sufficient steam has been introduced into the chamber 1, it is normally the practice to shut the valve 45 and to begin re-evacuation of the chamber.

As has been pointed out, the steam in the chamber becomes superheated during the re-evacuation period and this tends to further lower the moisture content of the material.

To overcome this drying effect, water is introduced into the chamber 1 by the water supply conduit 47, controlled by the valve 49. The conduit 47 extends through the wall of the chamber 1 and leakage between the wall and the conduit is prevented by the packing 51 held in position by the bushing 53 as shown in Fig. 2.

Within the chamber the conduit has branches 55 and 57 forming a loop within the walls of the treating chamber 1. Each branch 55 and 57 has a plurality of water sprays 59 to direct the water into the treating chamber in order to cool it. Some of this water strikes the top wall. Mounted on angle irons 61, fastened to the side walls 63 of the chamber is an inverted, V-shaped baffle plate 65 as is shown in Fig. 4. This baffle plate 65 is provided so that the water will not be sprayed directly on the material being treated. In fact, it is very important that no water come directly in contact with the material.

Due to the shape of the baffle plate 65, water dropping from the top wall 60 is directed toward the side wall 63 when it strikes the baffle 65. It will be noted that the baffle 65 is spaced from the side walls 63 so that water may fall between the angle iron 61 toward the bottom of the chamber without contacting the side wall 63. Obviously, the purpose of spacing the baffle 65 from the walls 63 is to provide a passage from the portion of the chamber below the baffle 65 to the connection to the jet 7 at the top of the chamber so that the portion of the chamber below the baffle plate 65 may be evacuated.

Situated below the baffle 65 and the angle iron 61 are auxiliary baffle plates 67 which are fastened and inclined toward the walls 63. These auxiliary baffle plates are provided with slots 69 adjacent the side walls 63 in order that any water flowing or dropping from the edges of the baffle plate 65 will strike the auxiliary baffles 67 and flow through the slots along the side walls 63 to the bottom of the chamber 1. Any water which collects at the bottom of the chamber 1 is removed therefrom by the drain 71. With this arrangement, when the steam supplied by the conduit 43 has been introduced into the chamber 1, the walls of the chamber may be cooled by spraying water through the sprays 59 onto top wall 60 and this water then flows over the baffle 65 and thence, by means of the auxiliary baffles 67, along the side walls 63. The temperature in the chamber will be lowered by the vaporization of most of this water so that a saturated vapor condition will be present in the chamber when re-evacuation is begun and, as a result, there can be no excessive drying of the material treated.

With the present construction, it is possible to increase the vacuum of chamber 1 without starting the evacuators 7 and 29. By introducing water into the chamber 1 this chamber acts as a condenser since the temperature of the chamber is lowered and, consequently, the condensable fluids in the chamber will be condensed. This action takes place before the blast gate 17 is to open. The cooling water flowing through the barometric condenser 15, and the continuously operating vacuum pump connected to the barometric condenser 15 will maintain a low pressure in the barometric condenser. Upon opening the blast gate 17, the higher pressure of the chamber 1 will cause the non-condensable fluids in the chamber to flow into the barometric condenser and be removed by the vacuum pump.

While the invention has been described with specific reference to the accompanying drawing it is not to be limited save as defined in the appended claims.

I claim:

1. In an organic material treating apparatus having a treating chamber provided with evacuators to withdraw fluid therefrom and a steam conduit to introduce steam thereto, means to introduce water to wet and cool the walls of the chamber after steam has been introduced for preventing transfer of heat therefrom to the steam comprising a spray header, a baffle plate below the spray header spaced from the walls of the treating chamber, angle irons secured to the chamber wall to support the baffle plate, and auxiliary baffle plates below the first said baffle plate secured to the walls of the treating chamber and having openings along the walls to enable water striking the auxiliary baffle plates to be directed along the walls of the chamber for cooling them.

2. In an organic material treating apparatus having a treating chamber, means to introduce steam into the chamber, a conduit to introduce cooling liquid into the chamber to wet the walls thereof for preventing transfer of heat therefrom to the steam adapted to spray liquid toward the central axis of the chamber, an inverted V-shaped baffle plate spaced from the sidewalls of the chamber, angle irons on the sidewalls of the chamber to support the inverted V-shaped baffle plate, and sidewall baffle plates below said inverted V-shaped baffle plate having openings therein adjacent the sidewalls to direct cooling liquid flowing from the conduit along the surface of the inverted V-shaped baffle plate to the surface of the sidewalls.

FRANK B. DOYLE.